Figure 1:
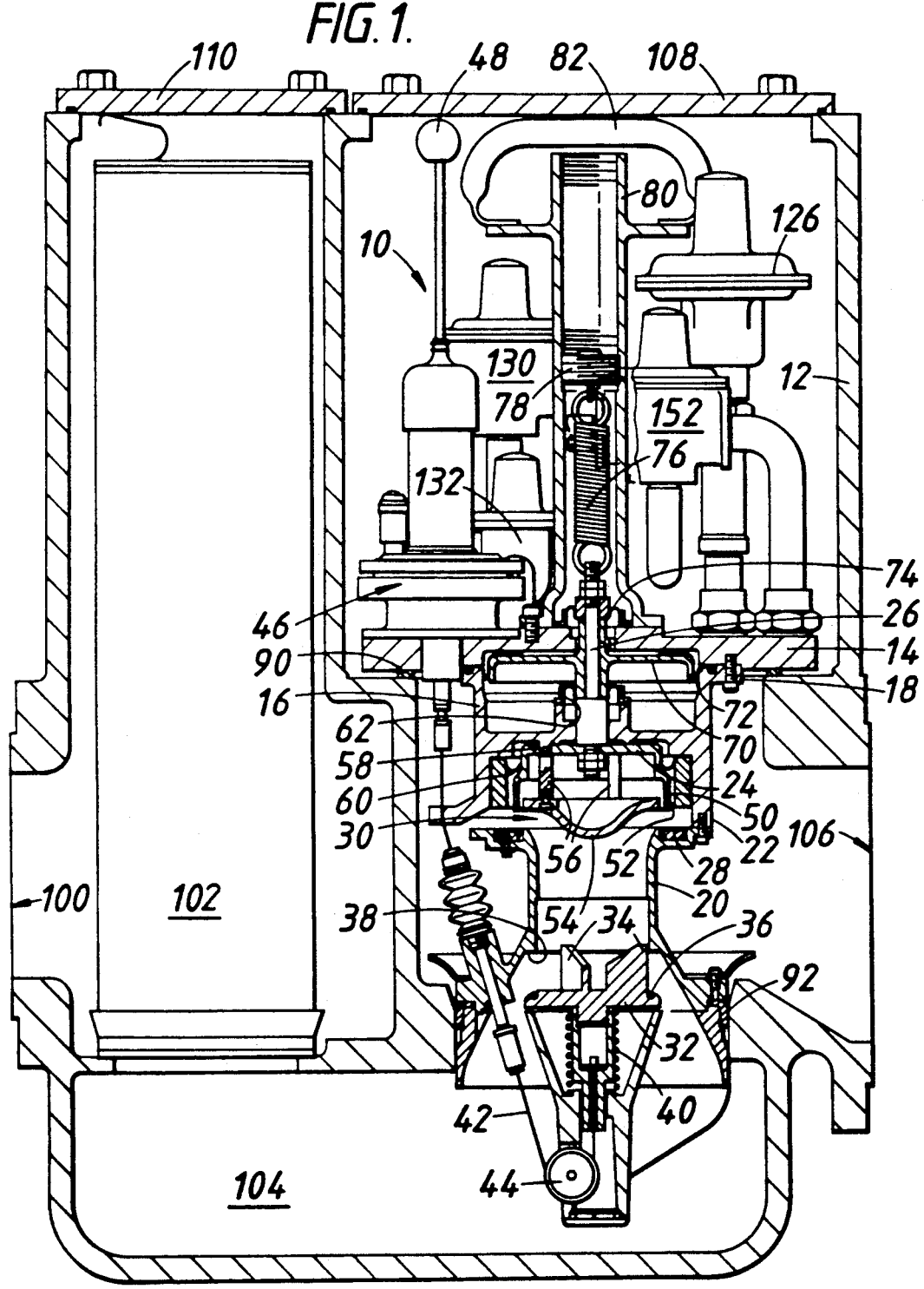

United States Patent

Wood

[11] Patent Number: 5,105,847
[45] Date of Patent: Apr. 21, 1992

[54] GAS PRESSURE CONTROL VALVE CARTRIDGE

[75] Inventor: Kenneth R. Wood, Newcastle-upon-Tyne, United Kingdom

[73] Assignee: British Gas plc, London, England

[21] Appl. No.: 739,287

[22] Filed: Aug. 2, 1991

[30] Foreign Application Priority Data

Aug. 3, 1990 [GB] United Kingdom ............... 9017074

[51] Int. Cl.⁵ .......................................... G05D 16/06
[52] U.S. Cl. ................................. 137/489; 251/282; 137/454.2
[58] Field of Search ............... 137/489, 505.18, 454.2; 251/282

[56] References Cited

U.S. PATENT DOCUMENTS

| | | | |
|---|---|---|---|
| 2,291,731 | 8/1942 | Lake | 137/489 X |
| 2,627,703 | 2/1953 | Spencer | 137/489 X |
| 2,707,970 | 5/1955 | Hughes | 137/489 |
| 3,373,765 | 3/1968 | McCarty | 137/489 |
| 4,477,056 | 10/1984 | Alexius | 251/282 |
| 4,500,070 | 2/1985 | Riollet | 251/282 |

FOREIGN PATENT DOCUMENTS

2091849 8/1982 United Kingdom .

Primary Examiner—Alan Cohan
Attorney, Agent, or Firm—Larson and Taylor

[57] ABSTRACT

The cartridge (10) has a bulkhead (14) carrying a housing (16) on which is mounted a hollow inlet member (20). A valve member (24) is accommodated in the housing and is attached to a valve operating rod (26) extending through the bulkhead and having a pilot control system mounted on the opposite side of the bulkhead from the housing. A valve seat (28) is supported on the inlet member, which defines with the housing an outlet (30), across which the valve member travels when moving towards and away from the valve seat. The pilot control system has an outlet tube passing through the bulkhead and communicating with the interior of the inlet member and having an outlet tube passing through the bulkhead and opening outside the housing and the inlet member. The cartridge has a slam-shut valve member (32) slidable in the lower end of the inlet member operated by a cable (42) and an actuator (46).

8 Claims, 2 Drawing Sheets

GAS PRESSURE CONTROL VALVE CARTRIDGE

This invention relates to gas pressure control valve cartridges.

The cartridge in use fits into a casing and the two together known as a gas pressure control module are fitted in line in a gas pressure main or pipe and preferably are buried beneath the soil.

A gas pressure control valve is shown in our British patent specification No. GB-B-2091849 in which a body defines a passageway for the flow of fluid therethrough and having an inlet opening and an outlet opening connected to said passageway, a valve member within said body connected to valve-actuating means so as to be movable thereby to constrict the flow of fluid in said passageway at a defined location therein, said valve member being movable substantially transverse to the direction of flow of said fluid at said defined location where said fluid in constricted, a shielding member upstream of said location to shield said movable valve member from said upstream flow, said valve member being a valve head of piston-like form and co-operates with said shielding member to form a fluid flow path downstream of said defined location, and seal means between said valve head and said shielding member whereby said compensating chamber is isolated from said upstream fluid flow when the valve is closed.

In that valve, gas flow occurred first of all around the shielding member, then through the constriction, the gas flowing radially inwardly at that point, and then the gas flow reversed so as to flow outwardly. The valve member moved, in the closing sense generally in the overall sense of gas flow. That is to say, the overall gas flow was upwards and closing movement of the valve was in the same sense.

An object of the invention is to provide a valve in which such gas reversal after passing the constriction is avoided and in which the sense of the closing movement of the valve member is opposite to the overall sense of gas flow.

A gas pressure control valve cartridge according to the invention, comprises a bulkhead, a hollow having supported at a first end by said bulkhead, and an open ended tubular inlet member supported upon the second end of said housing, said housing accommodating a valve member attached to a valve operating rod extending through said bulkhead, said valve member having a pilot control system mounted on the opposite side of said bulkhead from said housing, said inlet member providing a valve seat, said housing and said inlet member together defining an outlet leading from the interior of said inlet member and movement of said valve member away from said bulkhead and said housing and towards said valve seat crossing said outlet, said pilot control system having an inlet tube passing through said bulkhead and communicating with the interior of said inlet member and having an outlet tube passing through the bulkhead and opening outside said housing and inlet member.

Preferably, the housing carries a deflector which with an adjacent part of the housing defines a gap with its mouth facing towards said valve seat, said valve member being cup-shaped and terminating in a skirt which is movable through said gap towards and away from said valve seat.

Preferably, the forces due to gas pressure acting on the valve member are substantially balanced.

Figure 2:
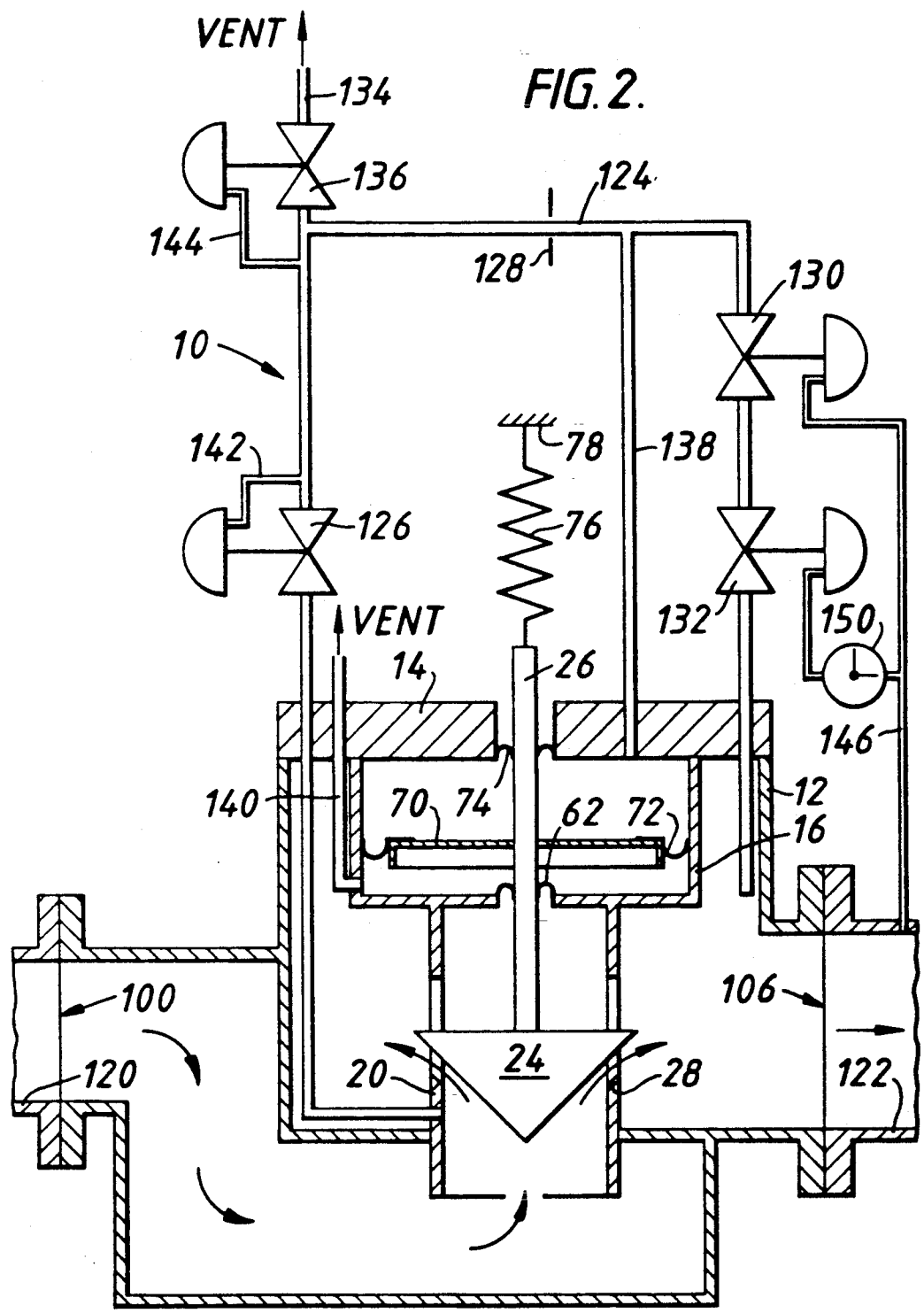

An embodiment of the invention will now be described by way of example with reference to the accompanying drawings, in which:

FIG. 1 is a vertical section through the gas pressure control valve cartridge inside a casing the two forming a module; and FIG. 2 is a diagrammatic view of the module of FIG. 1 installed in a gas main with control circuitry.

FIG. 1 shows the gas pressure control valve cartridge 10 fitted in a casing 12 the two together forming a so-called gas pressure control module. The cartridge 10 comprises the following principal components: a bulkhead 14; a hollow housing 16 supported at a first end 18 by the bulkhead 14; an open-ended tubular inlet member 20 supported upon the second end 22 of said housing 16; a valve member 24 accommodated in said housing 16 attached to a valve operating rod 26 extending through the bulkhead 14; a valve seat 28 provided by the inlet member 20; an outlet 30 defined by the housing 16 and the inlet member 20 together.

The inlet member 20 is completely blocked when a slam-shut valve member 32 closes. The valve member 32 has vanes 34 which are in a sliding relationship with the interior of the inlet member 20. The valve member 32 has an annular seal 36 which, on closure of the valve, seals against an annular shoulder 38 on the inlet member 20. The valve member 32 is pushed in the closing direction by a compression spring 40. The valve member 32 is held open by a cable 42 which extends downwardly, then passes around a pulley 44 and then passes upwardly to actuator mechanism 46. A re-set handle 48 allows the valve member 32 to be re-opened following tripping of the mechanism 46.

The main valve member 24 is cup-shaped and terminates on a skirt 50, which moves through a gap 52 between the wall of the housing 16 and a fixed deflector 54. The deflector 54 is secured upon three columns 56 fixed to the housing 16. Each column 56 passes through a hole 58 in the base wall of the valve member 24.

A first annular diaphragm 60 has its outer annular margin connected to the housing 16 and its inner annular margin connected to the valve member 24. A second annular diaphragm 62 has its outer annular margin connected to the housing 16 and its inner annular margin connected to the valve operating rod 26.

The valve operating rod 26 passes through, and is secured to, a valve operating piston 70. The piston 70 is accommodated in the housing 16 and also partly in a recess in the bulkhead 14. An annular valve operating diaphragm 72 has its outer annular margin connected to the valve housing 16 and its inner, annular margin connected to the valve operating piston 70.

An annular sealing diaphragm 74 has its outer, annular margin connected to the bulkhead 14 and its inner, annular margin connected to the valve operating piston 70.

The volume below the valve operating diaphragm 72 is vented to atmosphere (see FIG. 2). The volume above the first annular diaphragm 60 communicates with the volume beneath the second annular diaphragm 62 through a port (not shown) through the housing 16. The port is machined close to, and parallel to, the central passage through which passes the valve operating rod 26.

The valve operating rod 26 emerges from the upper end of the valve operating piston 70 and it secured to the lower end of a tension spring 76. The upper end of the tension spring 76 is anchored to an anchorage 78 in a hollow column 80 attached to the bulkhead 14. The column 80 carries two handles side by side, one of which is shown at 82, by which the whole cartridge 10 may be lifted out of the module casing 12.

The cartridge 10 has an annular seal 90 on the underside of the bulkhead 14 and another annular seal 92 at the outside of the tubular inlet 20. In use, gas enters the casing 12 from an inlet portion of a gas main (FIG. 2) and passes through the inlet 100 to the casing 12 and through a cylindrical gas filter 102. The gas passes downwardly and out of the filter 102 and enters a lower part 104 of the casing 12. The gas passes upwardly into the gas inlet member 20 and out at the upper end of the inlet member 20 through the outlet 30. Finally, the gas leaves the casing 12 through the outlet 106 and enters the outlet portion of the gas main (FIG. 2).

The casing 12 has a removable cap 108 to the cartridge-containing space and a separate cap 110 to the filter-containing space.

The forces acting on the valve member 24 due to gas pressure are substantially balanced. The pressure of the gas in the inlet member 20 acts upwardly over the of the inside of the cup-shaped valve member 24 because there is a small gap between the skirt 50 of the valve member 24 and the fixed deflector 54. The inlet pressure also reaches the rear side of the valve member 24 via the holes 58. It also acts, downwardly, upon the first diaphragm 60. The inlet pressure also reaches the second diaphragm 62, upon which it acts upwardly, via the machined port (not shown) mentioned above.

The outlet pressure that is, the pressure downstream of the skirt 50, within the outlet 30, acts upwardly upon the first diaphragm 60. The outlet pressure reaches the diaphragm 60 via a small gap between the skirt 50 and the adjacent wall of the housing 16.

By this arrangement the forces upon the valve member 24 due to pressure are substantially balanced. The deflector 54 prevents the valve member 24 being affected by gas impingement upon the valve member 24.

FIG. 2 diagrammatically shows the gas pressure control valve cartridge 10 inside a casing 12, the two forming a module. In FIG. 2 the diaphragm 60 and the deflector 54 are omitted and the valve member 24 is shown as having a deflector-like structure. The inlet opening 100 of the casing 12 is connected to the inlet portion 120 of a gas pipe or main and the outlet opening 106 of the casing 12 in connected main. The filter 102 and the slam-shut valve 32 are omitted from FIG. 2 for simplicity.

FIG. 2 shows the manner in which a pilot control system mounted on the upper side of the bulkhead 14 is connected to the valve made up of the valve member 24 and the valve seat 28. It can be seen that the connection pipes to the various parts of the pilot control system are wholly contained in the gas pressure control valve cartridge 10 except for the connection of a pipe 146, which opens into the outlet portion 122 some distance away from the module. Thus, apart from the casing 12, the inlet and outlet portions of the main 120 and 122, the end portion of the pipe 146 and the clock valve 150, everything shown in FIG. 2 is part of the gas pressure control valve cartridge 10.

A control pipe loop 124 is connected in parallel with the gas path through the valve seat 28. The control pipe loop 124 starts inside the inlet member 20 upstream of the valve seat 28 and the loop 124 travels through the bulkhead 14. The loop 124 ends (inside the casing 12) outside the housing 16 and outside the inlet member 20.

The control pipe loop 124 contains a pre-regulator valve 126; a restrictor 128; a control pilot valve 130; and optionally a clocking pilot valve 132. A vent 134 to atmosphere is provided downstream of the pre-regulator valve 126. The vent 134 is controlled by a relief valve 136. In the actual cartridge shown in FIG. 1, the valve 136 is combined within the valve 126.

The loop 124 has a branch 138 which begins downstream of the restrictor 128 and, after passing down through the bulkhead 14 opens into the volume above the valve control piston 70. The volume below the piston 70 is connected to a vent 140 to atmosphere.

The pre-regulator valve 126 has the underside of its diaphragm (i.e. its control diaphragm) connected to the loop 124 at the downstream side of the valve 126 by a pipe 142. The relief valve 136 has the underside of its diaphragm connected to the loop 124 at the upstream side of the valve 136 by a pipe 144. The pilot valve 130 has the underside of its diaphragm connected to the outlet portion 122 by a pipe 146. If it is present, the clocking pilot valve 132 has the underside of its diaphragm connected to the pipe 146.

The system shown in FIG. 2 omits a safety relief valve and the slam-shut valve, for simplicity, but both are shown in FIG. 1, the relief valve being shown at 152.

The system shown in FIG. 2 operates as follows.

Assuming there is a steady flow of gas from the inlet portion 120 to the outlet portion 122 of the gas main then a small proportion of the flow will pass through the control loop 124. The pressure in the control loop 124 between the pre-regulator 126 and the restrictor 128 is maintained at a constant value by the pre-regulator 126. A reduction in pressure occurs across the restrictor 128 and the pressure downstream of the restrictor is communicated by the branch pipe 138 to the space above the control piston 70. The resultant force on the piston 70 is balanced by the tension in the spring 76.

In the event of a fall in pressure in the outlet portion of the main 122 caused by either an increase in demand for gas or a fall in the inlet pressure then the control pilot 130 will move in the opening sense thus increasing the flow through the control loop 124. This increased flow results in an increased pressure drop across the restrictor 128 and hence a lower pressure above the control piston 70, causing an upward movement of the piston 70 under the tension in the spring 76. This opens the valve inlet 30, the skirt 50 of the valve member 24 moving away from the valve seat 28. Consequently, there is an increased flow from the inlet portion 120 to the outlet portion 122 and the pressure is restored to its former value.

The pressure under the diaphragm of the control pilot valve 130 is restored to its former value causing the pilot valve 130 to move in a closing direction to restore the pressures in the control loop 124 and the branch 130 to substantially their previous values, corresponding to the new position of the valve member 24.

In the event of a rise in pressure in the outlet portion of the main 122 caused by either a reduction in demand for gas or a rise in the inlet pressure then the control pilot 130 will move in the closing sense thus reducing the flow through the control loop 124. This reduced flow results in a reduced pressure drop across the restrictor 128 and hence a higher pressure above the control piston 70, causing a downward movement of the piston 70 under the tension in the spring 76. This closes the valve inlet 30, the skirt 50 of the valve member 24 moving towards the valve seat 28. Consequently, there is a reduced flow from the inlet portion 120 to the outlet portion 122 and the pressure is restored to its former value.

The pressure under the diaphragm of the control pilot valve 130 is restored to its former value causing the pilot valve 130 to move in an opening direction to restore the pressures in the control loop 124 and the branch 130 to substantially their previous values, corresponding to the new position of the valve member 24.

If there is no demand for gas then the control pilot 130 will completely close and the flow through the control loop 124 ceases. The pressure across the restrictor 128 equalizes and rises to the outlet pressure setting of the pre-regulator 126. The resulting increased pressure above the control piston 70 acts to press the control valve skirt 50 against the valve seat 28, thus aiding the leak-tight shut-off of the control valve 24.

In the event that the clocking pilot valve 132 is fitted its mode of operation is as follows. The clocking pilot valve 132 is set to operate at a lower pressure than the pilot valve 130. Assuming the clock valve at 150 opens to give night time control and to allow the pressure in the outlet portion 122 of the main to reach the diaphragm of the valve 132, the valve 132 progressively closes. This causes the main valve 24 to move towards its seat 28. At the same time the control pilot valve 130 opens progressively. The pressure in the loop 124 increases to the right of the restrictor 128, causing the closing movement of the main valve 24. Eventually, all control is by the valve 132 with operation of the system as previously described. The control pilot valve 130 remains fully open during nightime control.

The cartridge 10 can be manufactured in a basic form without the slam-shut valve 32, the relief valve not shown) and the clocking pilot valve 132, together with its clock valve 150, all of which may be considered as optional extras.

I claim:

1. A gas pressure control valve cartridge comprising a bulkhead, a hollow housing supported at a first end by said bulkhead, and an open ended tubular inlet member supported upon the second end of said housing, said housing accommodating a valve member attached to a valve operating rod extending through said bulkhead, said valve member having a pilot control system mounted on the opposite side of said bulkhead from said housing, said inlet member providing a valve seat, said housing and said inlet member together defining an outlet leading from the interior of said inlet member and movement of said valve member away from said housing and said bulkhead and towards said valve seat crossing said outlet, said pilot control system having an inlet tube passing through said bulkhead and communicating with the interior of said inlet member and having an outlet tube passing through the bulkhead and opening outside said housing and inlet member.

2. A cartridge according to claim 1 said housing carrying a deflector which with an adjacent part of the housing defines a gap with its mouth facing towards said valve seat, said valve member being cup-shaped and terminating in a skirt which is movable through said gap towards and away from said valve seat.

3. A cartridge according to claim 1, the forces due to gas pressure acting on the valve member being substantially balanced.

4. A cartridge according to claim 3, a first annular diaphragm being fixed and at its outer margin to the housing and at its inner margin to the valve member, a second annular diaphragm being fixed at its outer margin to the housing and at its inner margin to said valve operating rod fastened to the valve member, the valve member having through passages through which extend columns upon which the deflector is mounted, inlet pressure gas reaching the front face of the valve member facing towards the inlet, reaching the rear face of the valve member and the rear face of said first diaphragm via said holes and also reaching said second diaphragm, outlet pressure gas reaching the front face of the first diaphragm, said inlet pressure gas and said outlet pressure gas being separated by the valve member where it approaches the valve seat, and the arrangement being that forces on the valve member due to said gas pressures are substantially balanced.

5. A cartridge according to claim 1, said valve operating rod being connected to a single valve operating piston accommodated in said housing with an annular valve operating diaphragm having its outer margin attached to the housing and its inner margin attached to the valve operating piston.

6. A cartridge according to claim 1, said valve operating rod being attached to a tension spring.

7. A cartridge according to claim 1 with a slam-shut valve member being arranged on closing to block said inlet member completely, said slam-shut valve member having vanes which are in a sliding relationship with the interior of said inlet member and also having an annular seal which on closure of said slam-shut valve seals against an annular shoulder on said member.

8. A cartridge according to claim 1 housed in a casing having a gas inlet opening and a gas outlet opening, the bulkhead sealingly engaging the casing wall at an upper location around said housing and the inlet member sealingly engaging, the casing wall at a lower location, and the casing affording a location for an inlet filter, the path of gas through the casing being from the inlet opening through the filter, through the inlet member, through the outlet past the valve member and out of the outlet opening.

* * * * *